United States Patent [19]

Liang

[11] Patent Number: 5,718,146

[45] Date of Patent: Feb. 17, 1998

[54] WASTE LEVEL DETECTOR FOR VEHICLE CESSPOOLS

[76] Inventor: Chung-Ho Liang, 3/F., No. 4, Lane 74, Chung-Shan 1st Rd., Lu-Chou Hsiang, Taipei County, Taiwan

[21] Appl. No.: 498,050

[22] Filed: Jul. 5, 1995

[51] Int. Cl.[6] .................................................. G01F 23/56
[52] U.S. Cl. ........................ 73/319; 73/DIG. 5; 73/313
[58] Field of Search ........................... 73/305, 309, 310, 73/313, 314, 319, DIG. 5, 322

[56] References Cited

U.S. PATENT DOCUMENTS

| | | | |
|---|---|---|---|
| 1,435,986 | 11/1922 | Scoville | 73/319 |
| 1,617,287 | 2/1927 | Huggins | 73/313 |
| 1,646,317 | 10/1927 | Rein | 73/322 |
| 1,747,022 | 2/1930 | Zur Nieden | 73/322 |
| 2,510,663 | 6/1950 | Schuessler | 73/319 |
| 2,868,016 | 1/1959 | Steed | 73/322 |
| 3,370,468 | 2/1968 | Healy | 73/322 |
| 3,992,941 | 11/1976 | McGoldrick | 73/DIG. 5 |
| 4,448,449 | 5/1984 | Halling et al. | 285/263 |
| 4,845,986 | 7/1989 | Hayashi et al. | 73/290 R |
| 5,155,311 | 10/1992 | Utke | 73/313 |
| 5,156,042 | 10/1992 | Carlin et al. | 73/313 |
| 5,156,047 | 10/1992 | Tuma et al. | 73/304 C |
| 5,347,849 | 9/1994 | Reeme et al. | 73/313 |
| 5,481,911 | 1/1996 | Liang | 73/313 |

FOREIGN PATENT DOCUMENTS

| | | | |
|---|---|---|---|
| 673120 | 10/1964 | Italy | 73/313 |
| 62-215831 | 9/1987 | Japan | 73/313 |
| 1059-439-A | 12/1983 | U.S.S.R. | 73/313 |

*Primary Examiner*—William A. Cuchlinski, Jr.
*Assistant Examiner*—Andrew Hirshfeld
*Attorney, Agent, or Firm*—Morton J. Rosenberg; David I. Klein; Jun Y. Lee

[57] ABSTRACT

A waste level detector including a holder fixedly secured to a vehicle's cesspool by screws, an elongated probe extended downwards from the holder and disposed inside the cesspool, a float movable along the probe, a magnet fixedly secured to the float, a detecting circuit mounted inside the elongated probe to detect the elevation of the magnet, a perforated cylindrical casing having a top end threaded onto the outer thread on the holder and covered around the probe and a bottom end covered with a perforated end cap, and a cover covered on the holder above the cesspool.

1 Claim, 4 Drawing Sheets

WASTE LEVEL DETECTOR FOR VEHICLE CESSPOOLS

BACKGROUND OF THE INVENTION

The present invention relates to a waste level detector for detecting the level of wastes in a vehicle cesspool.

The cesspool of a vehicle is generally equipped with a waste level detector, which automatically detects the level of wastes and shows the detected value through a display means. FIGS. 3 and 4 show a conventional waste level detector for this purpose. This waste level detector comprises a holder 4 fixed to the cesspool 9 by screws, a probe 6 extended downwards from the holder 4, a lifting rod 7 connected to the bottom end of the probe 6, and a bellows tube 5 with folds 51 and 52 covered around the probe 6 and the lifting rod 7. When the level of wastes in the cesspool 9 increases, the bellows tube 5 is compressed (see FIG. 4), causing the to be lifting rod 7 to be lifted, and therefore the probe 6 is triggered by the lifting rod 7 to provide a signal to the display means (not shown). This structure of waste level detector is still not satisfactory in function. Because air vents 41 must be made on the holder 4 for letting air move in and out of the bellows tube 5, bad smell of the wastes will escape out of the cesspool 9 into the air inside the vehicle. Furthermore, if solid particles 91 are jammed in the folds 51 and 52, the bellows tube 5 become unable to work properly, causing the probe 6 to make an error detection.

SUMMARY OF THE INVENTION

The present invention has been accomplished to provide a waste level detector which eliminates the aforesaid drawbacks. According to one aspect of the present invention, the waste level detector is comprised of a holder fixedly secured to a vehicle's cesspool by screws, an elongated probe extended downwards from the holder, a float movable along the probe, a magnet fixedly secured to the float, a detecting circuit mounted inside the elongated probe to detect the elevation of the magnet, and a strainer fixed to the holder and covered around the probe. According to another aspect of the present invention, the strainer is comprised of a plurality of equal sections longitudinally connected together. Therefore, the length of the strainer can be conveniently adjusted subject to the size of the cesspool.

DETAILED DESCRIPTION OF THE PREFERRED EMBODIMENT

Figure 1:
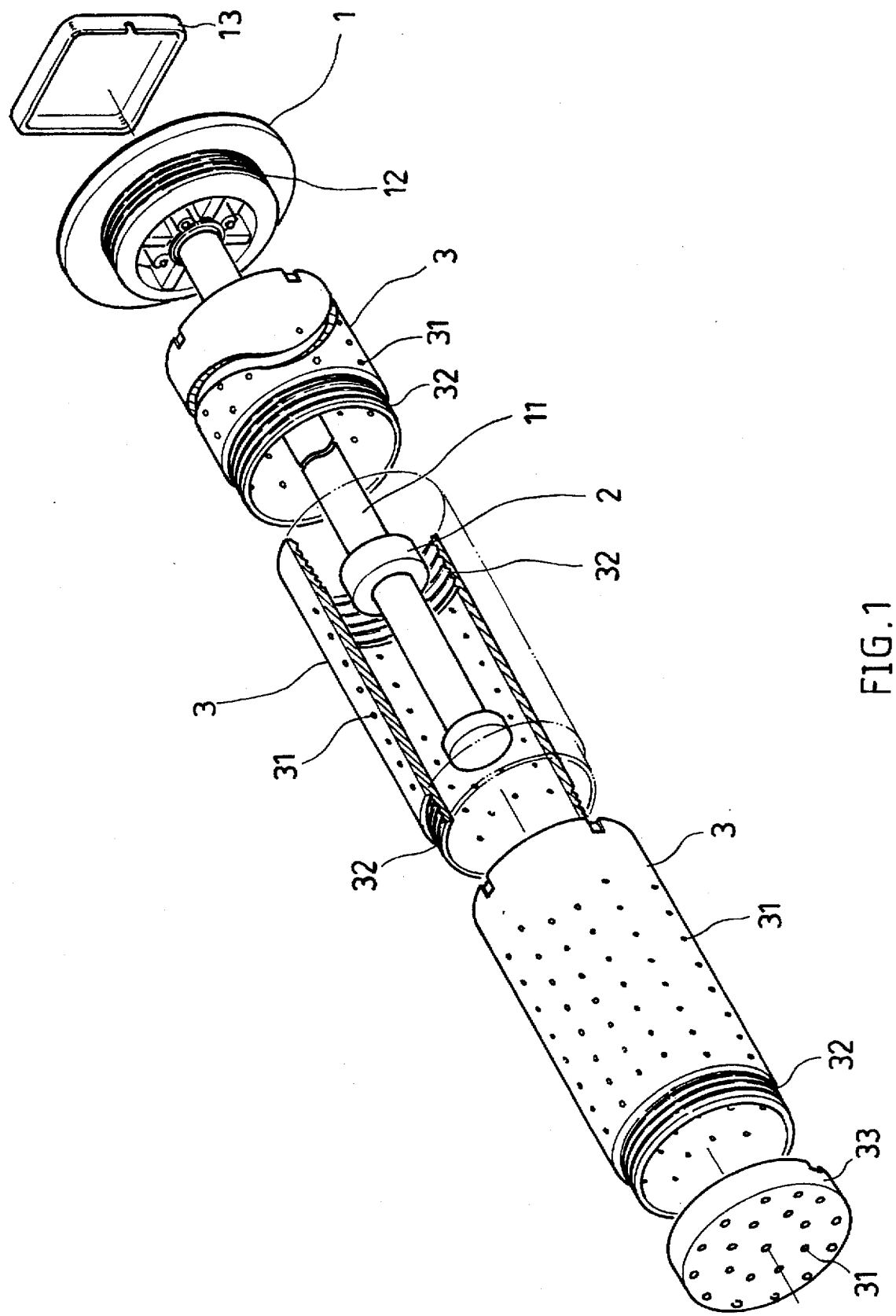
FIG. 1 is an exploded perspective view of a waste level detector according to the present invention.
Figure 2:
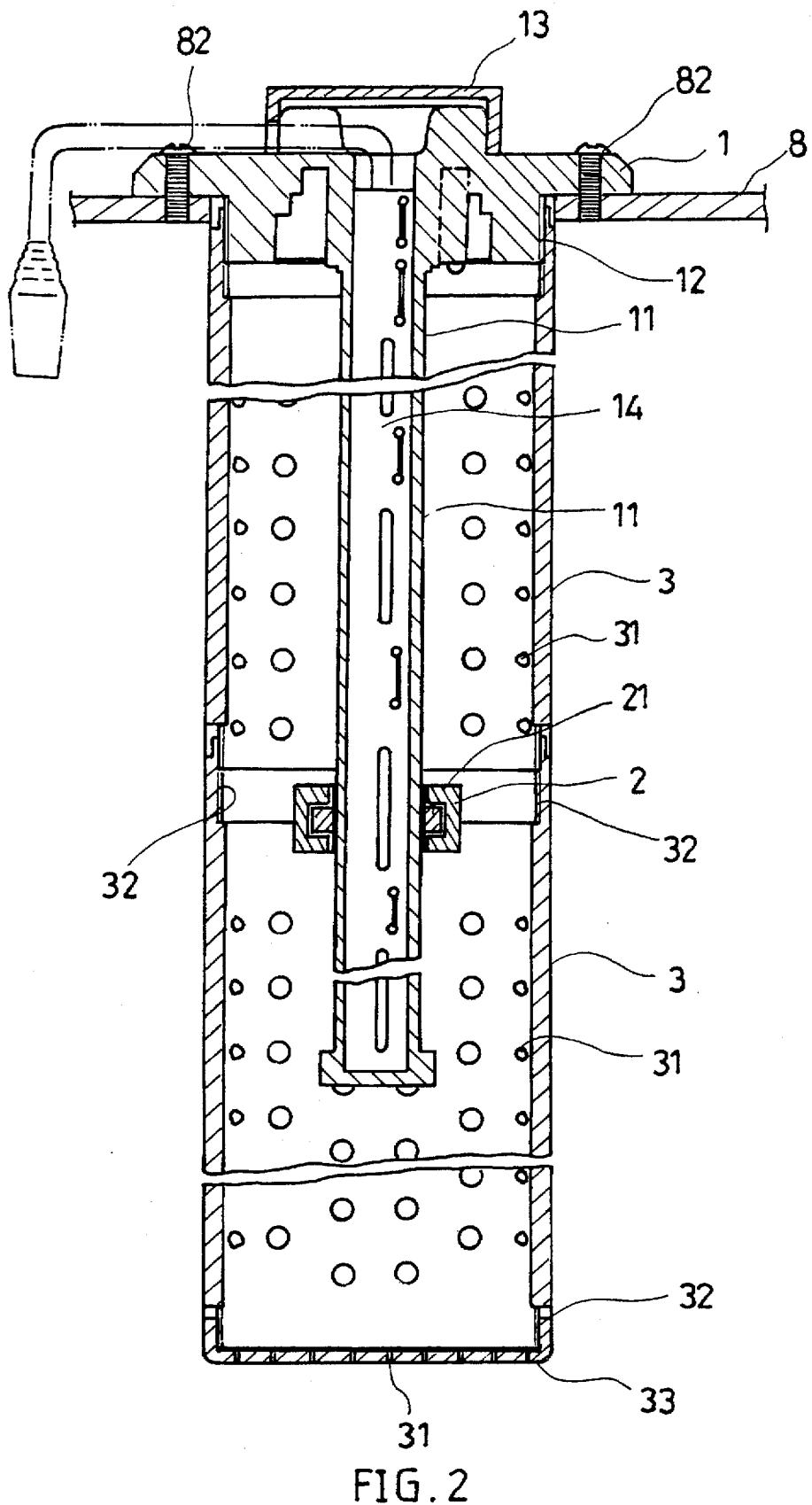
FIG. 2 is a longitudinal view in section of the waste level detector shown in FIG. 1.
Figure 3:
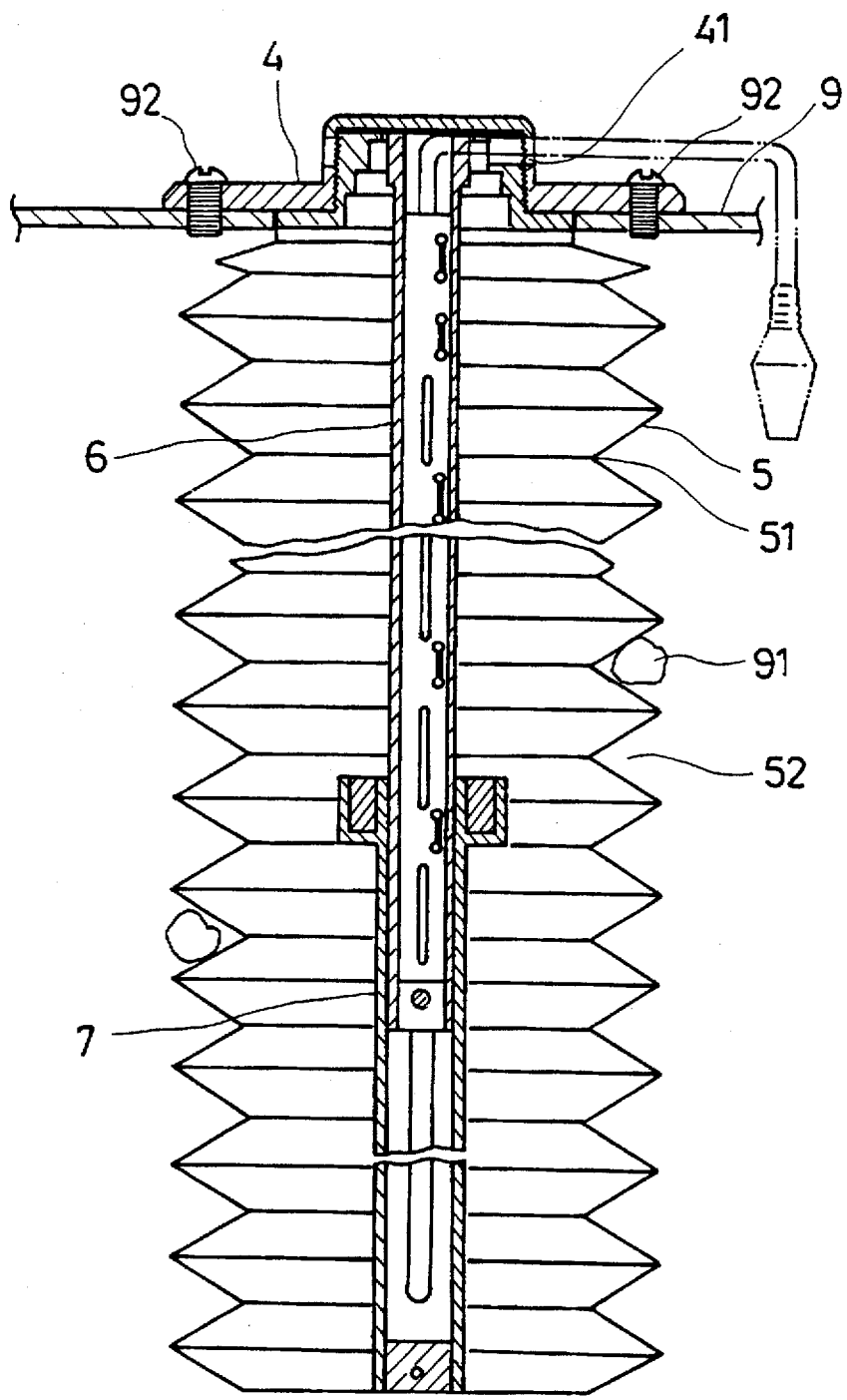
FIG. 3 shows a waste level detector according to the prior art.
Figure 4:
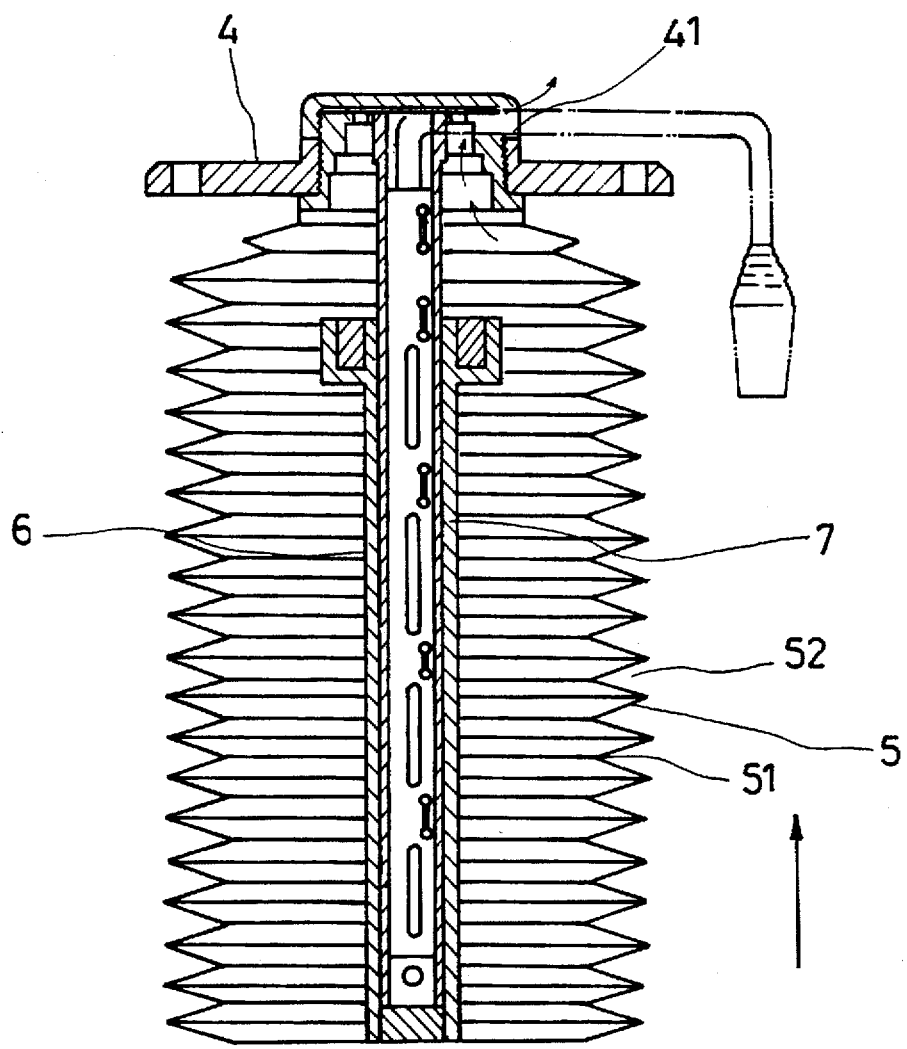
FIG. 4 shows the waste level detector of FIG. 3 compressed.

Referring to FIGS. 1 and 2, a waste level detector for vehicle cesspools in accordance with the present invention is generally comprised of a holder 1 fixedly secured to the top of a vehicle's cesspool 8 by screws 82, an elongated probe 11 extended downwards from the center of the holder 1 to hold a detecting circuit 14 on the inside, a float 2 movable along the probe 11, a magnet 21 fixedly secured to the float 2 and carried by it to act against the detecting circuit 14, a perforated cylindrical casing 3 having a top end threaded onto an outer thread 12 on the holder 1 and covered around the probe 11 and a bottom end covered with an end cap 33, and a cover 13 covered on the holder 1 above the cesspool 8. The cylindrical casing 3 and the end cap 33 have pores 31 for passing liquid, therefore they are used as a strainer to stop big particles from entering the inside of the waste level detector. When liquid waste enters the cylindrical casing 3 to move the float 2 upwards, the detecting circuit 14 is triggered by the magnet 21 to provide an electric signal to a display device (not shown), causing it to show a value corresponding to the elevation of the float 2.

Furthermore, the cylindrical casing 3 is comprised of a plurality of sections longitudinally connected together by threads 32 thereof. Therefore, the length of the cylindrical casing 3 can be adjusted subject to the size of the cesspool 8.

It is to be understood that the drawings are designed for purposes of illustration only, and are not intended as a definition of the limits and scope of the invention disclosed.

I claim:

1. A waste level detector coupled to a vehicle's cesspool containing liquid and waste particles, comprising:

a holder fixedly secured to an upper portion of the vehicle's cesspool by screws, said holder having an external thread formed thereon;

an elongated probe extending downwardly from said holder within the vehicle's cesspool;

a float movably coupled to said elongated probe for displacement thereon responsive to a change in elevation of a fluid level within the vehicle's cesspool;

a magnet fixedly coupled to said float for displacement therewith;

a detecting circuit mounted within said elongated probe for detecting an elevation of said magnet;

a perforated cylindrical casing surrounding said elongated probe and said float, said perforated cylindrical casing having one end coupled to said holder and an opposing end covered by a perforated cap, said casing being formed by a plurality of longitudinally extended cylindrical sections, each of said plurality of cylindrical sections having an external thread formed on a distal end thereof for coupling to said perforated cap or another of said plurality of cylindrical sections, each of said plurality of cylindrical sections having an internal thread formed on a proximal end for coupling with said external thread of said holder or said external thread of another of said plurality of cylindrical sections, each of said plurality of cylindrical sections having a plurality of apertures formed therethrough and disposed in both circumferentially and longitudinally spaced relationship for substantially an entire length thereof, said plurality of apertures having a size which allows passage of fluid therethrough and blocks passage of all said waste particles contained in said fluid thereby straining said fluid passing therethrough; and, a cover disposed on said holder external the vehicle's cesspool.

* * * * *